US011003353B2

(12) United States Patent
Leong

(10) Patent No.: US 11,003,353 B2
(45) Date of Patent: May 11, 2021

(54) METHOD AND SYSTEM OF ENHANCED INTERACTION WITH A SHARED SCREEN

(71) Applicant: MICROSOFT TECHNOLOGY LICENSING, LLC, Redmond, WA (US)

(72) Inventor: Eric Mun Khai Leong, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 18 days.

(21) Appl. No.: 16/382,165

(22) Filed: Apr. 11, 2019

(65) Prior Publication Data
US 2020/0326846 A1 Oct. 15, 2020

(51) Int. Cl.
*G06F 3/0488* (2013.01)
*G06F 3/0484* (2013.01)
*G06F 3/14* (2006.01)

(52) U.S. Cl.
CPC ...... *G06F 3/04886* (2013.01); *G06F 3/04842* (2013.01); *G06F 3/04847* (2013.01); *G06F 3/1454* (2013.01)

(58) Field of Classification Search
CPC ............. G06F 3/04886; G06F 3/04842; G06F 3/04847; G06F 3/1454
See application file for complete search history.

(56) References Cited

U.S. PATENT DOCUMENTS

| 6,564,246 B1 * | 5/2003 | Varma .................... G06Q 10/10 709/205 |
| 7,734,802 B1 * | 6/2010 | Gay ........................ G06Q 10/10 709/231 |
| 2005/0068290 A1 * | 3/2005 | Jaeger ................. G06F 3/04845 345/156 |
| 2010/0262950 A1 * | 10/2010 | Garland .............. G06F 3/04845 717/113 |
| 2012/0089928 A1 * | 4/2012 | Bryant ................ H04L 12/1827 715/753 |

(Continued)

OTHER PUBLICATIONS

"Set up and use Microsoft Whiteboard", Retrieved from: https://docs.microsoft.com/en-us/surface-hub/whiteboard-collaboration, Mar. 18, 2019, 3 Pages.

(Continued)

*Primary Examiner* — Eric J. Bycer
(74) *Attorney, Agent, or Firm* — NovoTechIP International PLLC

(57) ABSTRACT

A method of and system for enabling enhanced interactions with a shared screen during a virtual communication session is carried out by enabling display of gridlines on the shared screen. The method may include receiving a request via a first control of a user interface to display gridlines on a portion of the user interface, the portion of the user interface displaying a shared screen during the communication session between at least two participants in the communication session where a first participant shares the screen with a second participant, and upon receiving the request, enabling display of the gridlines on the shared screen of each of the first and the second participants. The first control of the user (Continued)

interface may be an option provided by a virtual communication environment via which the communication session between the first and the second participants is established.

20 Claims, 10 Drawing Sheets

(56) References Cited

U.S. PATENT DOCUMENTS

| | | | |
|---|---|---|---|
| 2013/0227389 A1* | 8/2013 | Knox | G06F 40/14 |
| | | | 715/234 |
| 2017/0199750 A1* | 7/2017 | Reuschel | G06F 3/011 |
| 2017/0228359 A1* | 8/2017 | Cuzzort | G06F 3/1454 |
| 2017/0237789 A1* | 8/2017 | Harner | G06F 3/017 |
| | | | 709/205 |

OTHER PUBLICATIONS

Chastine, Jeffreyw., "On Inter-Referential Awareness in Collaborative Augmented Reality", A Dissertation Submitted in Partial Fulfillment of the Requirements for the Degree of Doctor of Philosophy in the College of Arts and Sciences Georgia State University, Aug. 1, 2007, 191 Pages.

Greg, et al., "Microsoft Whiteboard", Retrieved from: https://www.youtube.com/watch?v=vW6FOO1Gk8U, Aug. 22, 2018, 4 Pages.

Greg, et al., "Microsoft Whiteboard Background Feature", Retrieved from: https://www.youtube.com/watch?v=cQ7RgGbHq30, Nov. 26, 2018, 3 Pages.

"International Search Report and Written Opinion Issued in PCT Application No. PCT/US20/024121", dated Jul. 2, 2020, 13 Pages.

\* cited by examiner

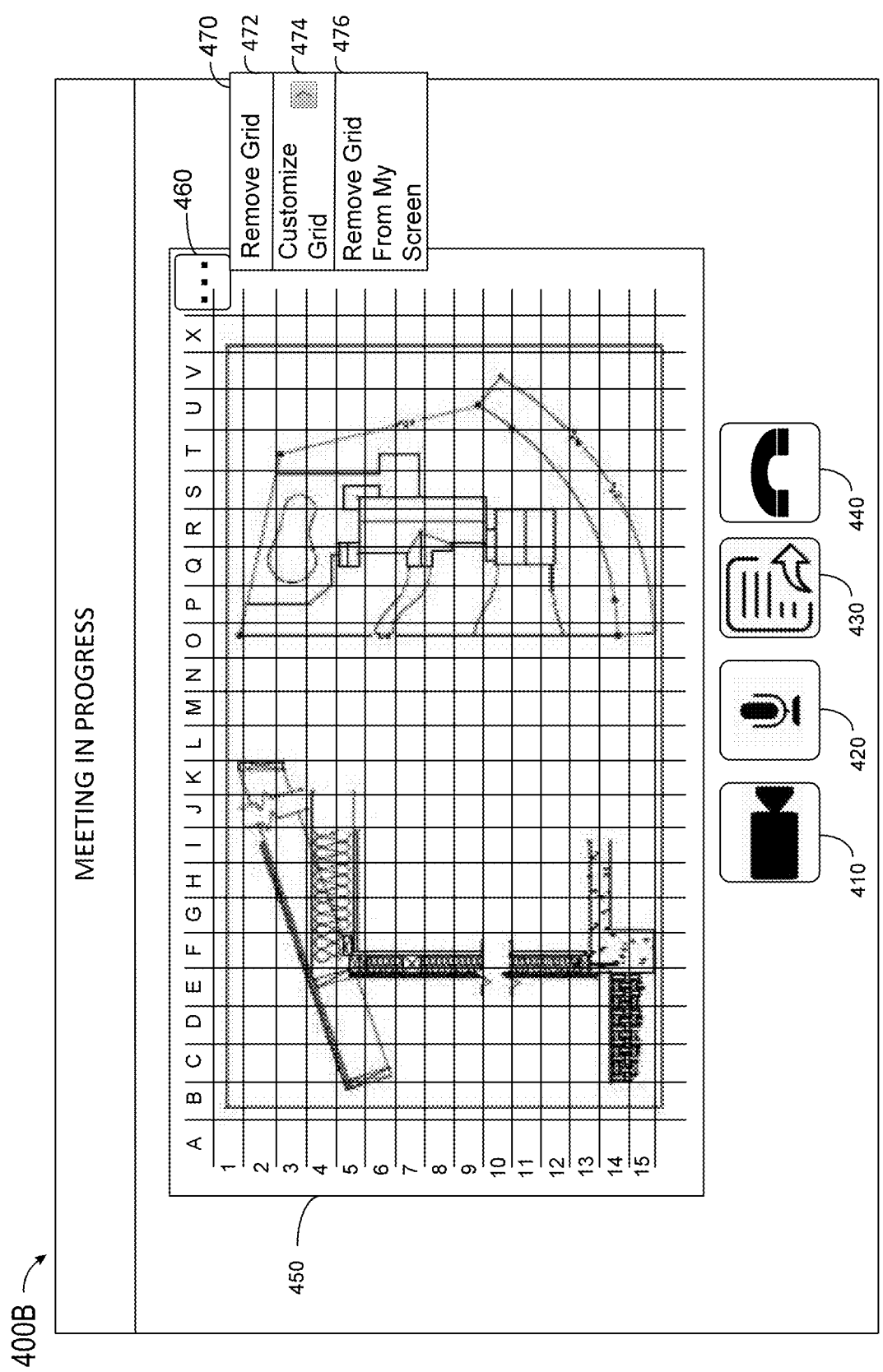

US 11,003,353 B2

METHOD AND SYSTEM OF ENHANCED INTERACTION WITH A SHARED SCREEN

TECHNICAL FIELD

This disclosure relates generally to interactions with shared content in a virtual communication environment and, more particularly, to enabling display of a grid on shared content during a virtual communication session.

BACKGROUND

In recent years, there has been a significant increase in the use of virtual communication applications that enable a person to communicate with one or more other people. This may be because more and more people work from home or collaborate with colleagues or others remotely from different locations. The use of these applications enables participants to communicate with each other, and as such, freely exchange ideas and information without the need to be in the same room, thus greatly reducing the cost and time associated with conducting in-person meetings.

As part of communicating, one or more participants may desire to present information or documents to the other participants in the group. During in-person meetings, this may be done by handing out print-outs to each participant or presenting a document via an electronic device that displays the content on a screen in the room. In a virtual communication environment, that may occur by enabling one or more participants to share content with the other participants. This is generally done by displaying the shared content on each participant's display screen. In such cases, control of the shared content remains with the presenter who can move through the document to, for example, point to a specific portion of the screen. This limits the ability of the participants to pinpoint a specific portion of the screen they would like to bring attention to.

Hence, there is a need for an improved method and system for enabling enhanced user interactions with shared content during a virtual communication session.

SUMMARY

One limitation of existing virtual communication software applications is that participants do not have an ability to interact with a document that is being shared by a presenter during a communication session (e.g., a virtual conference). In general, when a participant decides to present some information to the other participants during a virtual conference, a view of his/her screen is shared with the other participants. The presenter may then have sole control over the curser/pointer within the screen. For example, if the presenter chooses to present a computer-aided design (CAD) drawing, he/she may open the document and have the ability to use a pointer (e.g., a mouse, digital pen, or a finger when using a touch screen) to move a curser within the screen to point to various portions. The other participants may be able to view the curser's movements within the shared screen, but they may not be able to control the curser.

As a result, when a participant who is not the presenter wishes to bring attention to a particular portion of the screen, they may need to describe the portion well enough so that the remaining participants can identify it. This may prove to be time consuming and difficult, particularly if the shared screen contains complex content (e.g., a crowded drawing). An alternative implementation may allow the presenter to delegate control of the curser to another participant so that they use the curser to point to their desired portion. However, that would require the participant to make a request to the presenter who would in turn need to invoke an option within the communication application to delegate control of the curser to a particular participant. That can take valuable time out of the communication session. Furthermore, when control of the curser is turned over to a different participant, there is often a time delay associated with when the participant moves the curser and when the other participants can view the movements. This can be made further complicated, if a third participant desires to point to a different portion of the document and thus requires another change of control of the curser. As a result, whether using description to pinpoint the desired portion or taking control of the curse, the process is time-consuming, inefficient, and often unpleasant for the participants.

Thus, there is a need in the art for a method and system of enabling participants to easily and efficiently pinpoint particular portions of a shared screen during a virtual communication session.

To address these issues and more, in one general aspect, the instant application describes a device having a processor and a memory in communication with the processor where the memory stores executable instructions that, when executed by the processor, cause the device to perform multiple functions. The function may include receiving a request via a first control of a user interface to display gridlines on a portion of the user interface, the portion of the user interface displaying a shared screen during a communication session between at least two participants in the communication session where a first participant shares the shared screen with a second participant, and upon receiving the request, enabling display of the gridlines on the shared screen of each of the first and the second participants, where the first control of the user interface is an option provided by a virtual communication environment via which the communication session between the first and the second participants is established.

In yet another general aspect, the instant application describes a method for enabling display of gridlines on a shared screen during a virtual communication session. The method may include receiving a request via a first control of a user interface to display gridlines on a portion of the user interface, the portion of the user interface displaying a shared screen during a communication session between at least two participants in the communication session where a first participant shares the shared screen with a second participant, and upon receiving the request, enabling display of the gridlines on the shared screen of each of the first and the second participants, where the first control of the user interface is an option provided by a virtual communication environment via which the communication session between the first and the second participants is established.

In a further general aspect, the instant application describes a non-transitory computer readable medium on which are stored instructions that when executed cause a programmable device to receive a request via a first control of a user interface to display gridlines on a portion of the user interface, the portion of the user interface displaying a shared screen during a communication session between at least two participants in the communication session where a first participant shares the shared screen with a second participant, and upon receiving the request, enable display of the gridlines on the shared screen of each of the first and the second participants, where the first control of the user interface is an option provided by a virtual communication environment via which the communication session between the first and the second participants is established.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

FIGS. 4A-4B depict improved example UI screens, which display gridlines on the shared screen presented to participants during a virtual communication session.

DETAILED DESCRIPTION

Figure 1:
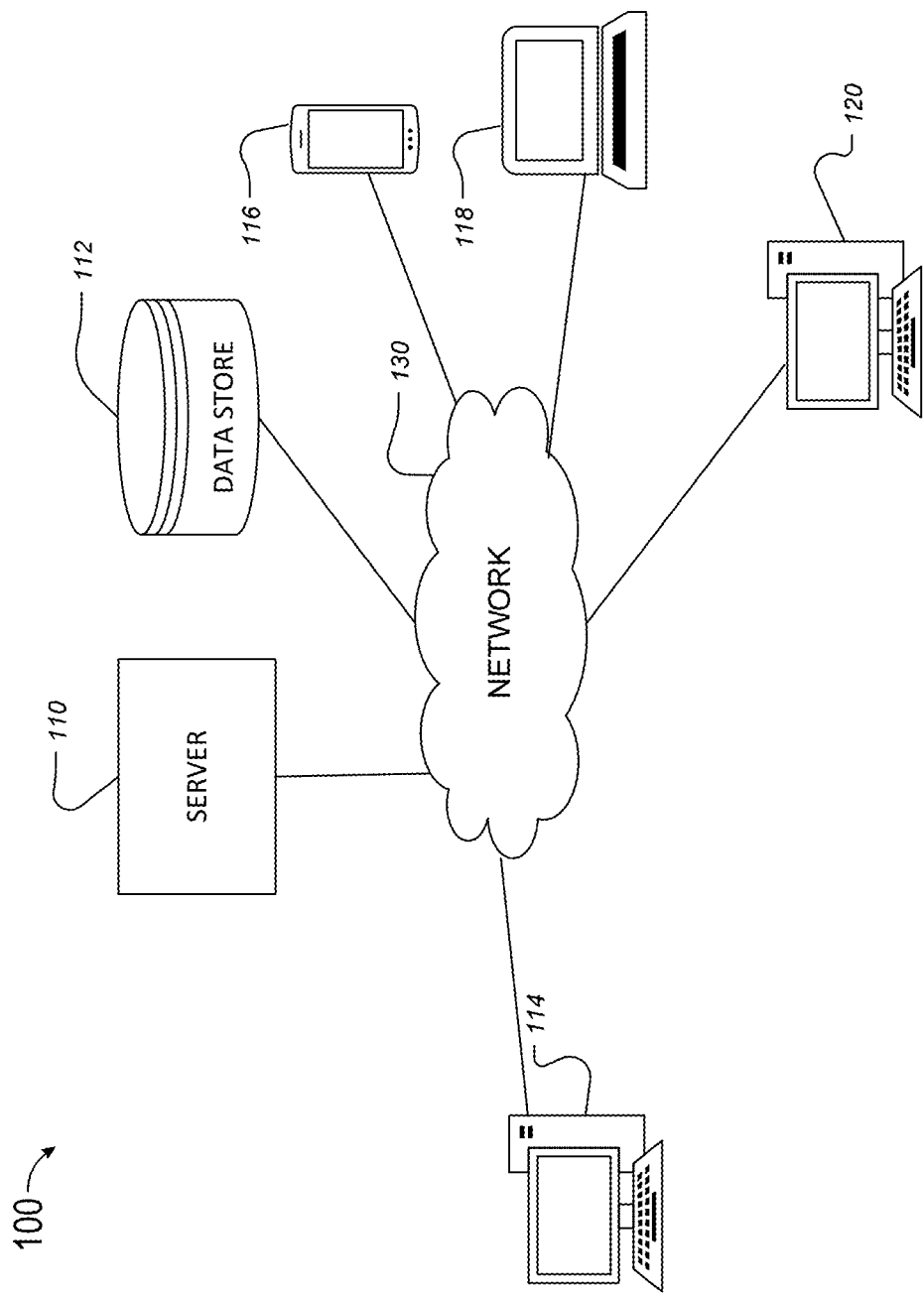
FIG. 1 depicts an example system upon which aspects of this disclosure may be implemented.

In the following detailed description, numerous specific details are set forth by way of examples in order to provide a thorough understanding of the relevant teachings. It will be apparent to persons of ordinary skill, upon reading this description, that various aspects can be practiced without such details. In other instances, well known methods, procedures, components, and/or circuitry have been described at a relatively high-level, without detail, in order to avoid unnecessarily obscuring aspects of the present teachings.

To address the issues discussed above and more, in an example, this description provides technology implemented for an improved method and system of enabling the display of gridlines on a shared screen during a virtual communication session. To improve the current methods of presenting information during a virtual communication session, the improved system and method may provide an option for each participant to turn on and off the display of gridlines on a shared screen. To achieve this, the virtual communication application used to facilitate the virtual communication session may include a control on a user interface that enables a user to turn on and off the display of gridlines on a shared screen. This may be done by transmitting an instruction from a participant's device to a server to begin displaying gridlines on the shared screen of each participant in the virtual communication session. In response, the server may enable the display of gridlines on each participant's shared screen by either transferring the instruction to a participant's device when the participant uses a local version of the virtual communication application or by enabling the display of the gridlines in an online session provided by an online virtual communication service. The gridlines may be overlaid on the shared screen by using, for example, a layered user interface technique to create and manage separate user interface elements within the shared screen. The process may involve minimal transfer of data and as a result can be done quickly and efficiently.

In an implementation, the resolution, color, labels, and other properties of the gridlines may be customizable to change the display as required based on the needs of the participants. For example, when a shared screen contains a dark background, the color of the gridlines may be changed from black to white to make them more visible. Furthermore, each participant may be able to turn on/off the gridlines individually on their own screen. This may enable a participant to bring attention to a particular portion or a ask a question without the need to specifically describe a particular portion of the screen or to request control of the curser. As a result, the solution provides an improved user experience for participants of a virtual communication environment in an efficient manner.

As will be understood by persons of skill in the art upon reading this disclosure, benefits and advantages provided by such implementations can include, but are not limited to, a solution to the technical problems of participants not being able to quickly pinpoint a particular portion of a shared screen during a virtual communication session. Technical solutions and implementations provided here optimize and improve the process of discussing a document during a virtual communication session. The benefits provided by these solutions include improving user experience in a timely and efficient manner.

FIG. 1 illustrates an example system 100, upon which aspects of this disclosure may be implemented. The system 100 may include a sever 110 which may be connected to or include a data store 112 in which data relating to a virtual communication session may be stored. The server 110 may be responsible for managing communications between various devices during virtual communication sessions. For example, the server 110 may run an application, stored for example in the data store 112, that enables virtual meetings or messaging between various participant devices. To do so, the server may receive signals from one or more of the meeting participants and transfer those signals to the other participants. The signals may be audio, video or other data signals. For example, the server may receive audio signals from each of the client devices and transmit those signals to other devices in the virtual conference to enable the participants to engage in a voice conversation. Video signals may be transferred during video-enabled virtual meetings to enable participants to see each other. Data signals may be transmitted to enable one or more participants to view a presenter's screen. Data signals may include data files that may be received and transmitted by the server to enable the participants to interact with a document being presented during the meeting. In one implementation, the server may provide a cloud-based virtual communication service.

The system 100 may also include a presenter client device 114 and multiple participant client devices 116, 118 and 120, each of which are connected via a network 130 to the server 110. Each of the client devices 112, 116, 118 and 120 may include or have access to a virtual communication application which enables users of each device to participate in virtual communication sessions such as virtual meetings. It should be noted, that although client device 114 is labeled as a presenter device and client devices 116, 118 and 120 are labeled as participant devices, each of the client devices 114, 116, 118 and 120 may become a presenter during a virtual communication session. The presenter client device may be the host of the virtual meeting or any of the other participant devices. Each of the client devices 114, 116, 118 and 120 may be able to enable the display of gridlines on a shared screen.

The client devices 114, 116, 118 and 120 may be personal or handheld computing devices having or being connected to both input and output elements. For example, the client devices 114, 116, 118 and 120 may be one of: a mobile telephone; a smart phone; a tablet; a phablet; a smart watch; a wearable computer; a personal computer; a desktop computer; a laptop computer; a gaming device/computer; a television; and the like. This list is for example purposes only and should not be considered as limiting. The network 110 may be a wired or wireless network(s) or a combination of wired and wireless networks that connect one or more elements of the system 100.

Figure 2:
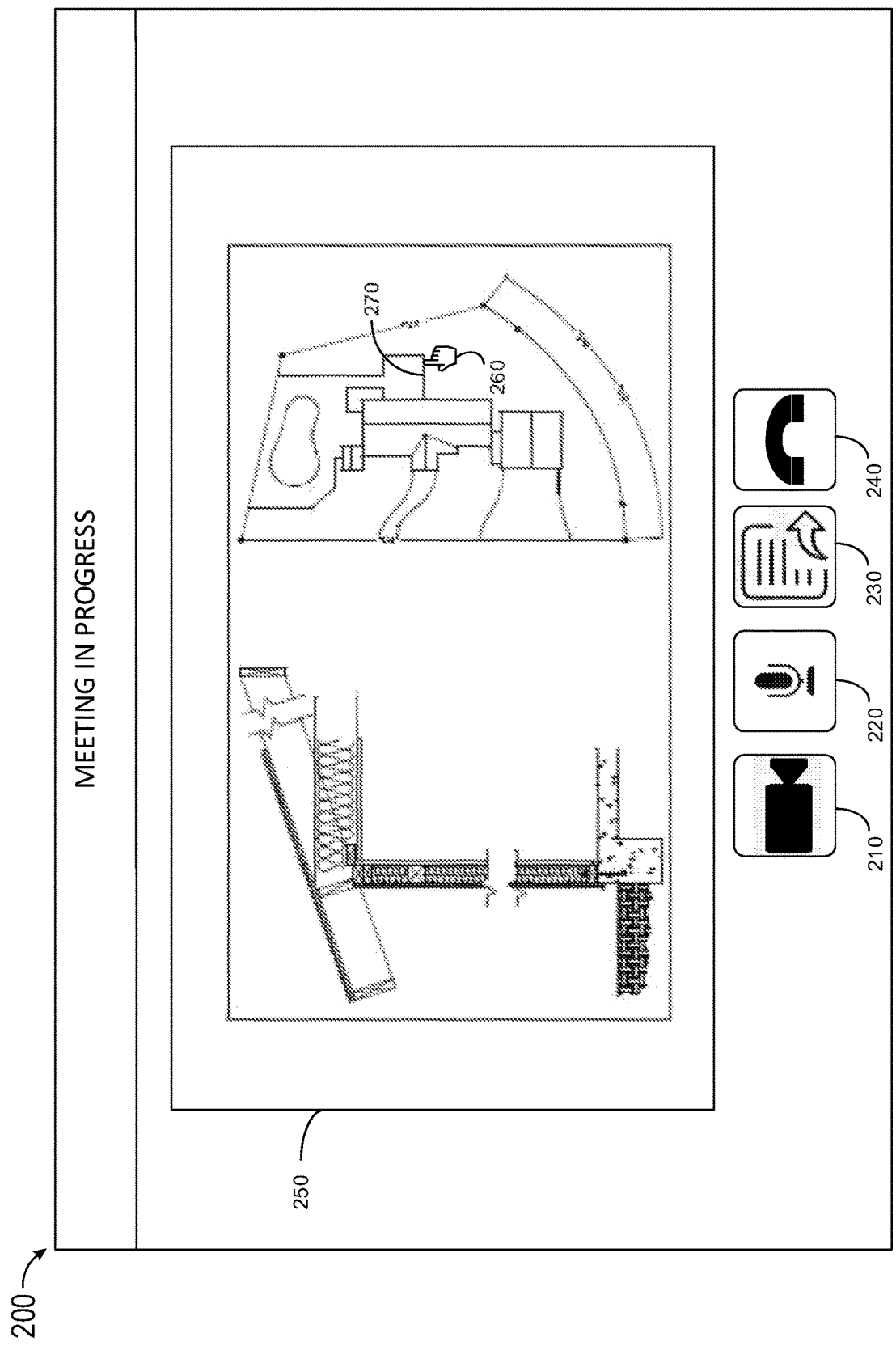
FIG. 2 depicts an example user interface for sharing a screen in a virtual meeting application.

FIG. 2 illustrates an example user interface (UI) screen 200 which may be presented to a participant during a virtual communication session, such as a virtual meeting, in which a document is being presented by one of the participants. The UI screen 200 may be shown on any of the client devices participating in the virtual meeting. In one implementation, the UI screen 200 is displayed by the virtual meeting application running on a meeting attendee's client device. Alternatively, the UI screen is shown via an online virtual meeting service. The UI screen 200 may include a button 210 to enable/disable video signals to be transmitted from the client device displaying the screen 200. This may be done, for example, to enable a video conference. The same button 210 may be used to enable and disable transmission of video signals. Similarly, a button 220 may be used to enable/disable transmission of audio signals during the meeting. Button 220 may be used for example to mute a microphone of the client device, when the participant does not desire to share audio signals from his/her environment with the meeting participants. When the participant is ready to speak, he/she may press the button 220 to unmute the device and enable transmission of audio signals.

The UI screen 200 may also include a start presentation button 230 which may enable the user to begin sharing a portion of his/her screen, a document to which the presenter has access to, or any other sharable information. In one implementation, upon pressing the presentation button 230, a menu may be presented to the user to enable selection of portion(s) of the screen the user wishes to share with the other participants. For example, the user may have the option of selecting to share one or more portions of any of the user's screens (e.g., when the user has access to multiple display devices and/or virtual display areas or virtual desktops), or a file (e.g. a document stored on the user's device or in a cloud storage device to which the user has access from the user's device). The user may also have the ability to choose to share only portions of the screen displaying a particular application, such as Microsoft® Word®, Microsoft® PowerPoint®, or any other Microsoft® Office® application. The selection may be made for example via a pop-up menu.

When the user chooses to share one or more portions of the screen, screen data of the user's screen may be transmitted to the server which may in turn transfer the data to the other participants. In this instant, the user may be able to open an application, open a document, play a video or perform any other operations that the user can normally perform on the user's device and transmission of screen data may enable the other meeting attendees to view the user's operations in real-time. Screen data may include image data, video data or any other type of data that enables capture, transmission and displaying of a copy of a user's screen. This may be achieved by utilizing a screen capture mechanism to capture and provide the screen data by any available means. For example, the screen capture mechanism may obtain an image of the screen or a representation of the screen in any type of form. A screen data processing mechanism may then be used to process (e.g. convert, translate, etc.) the representation into screen data that is suitable for transmission. In one implementation, an application programming interface (API) (e.g. an operating system API) may be used to capture, process and/or provide the screen data. The screen data may represent the screen as tiles, thus providing a tile representation of the screen. In one implementation, the screen data may provide a pixel or bit-image representation of the screen. Any other suitable screen data may be captured and utilized.

When the user chooses to share a document, a pop-up menu may enable the user to browse to a location (e.g., on the user's device) at which the document is stored. By clicking on the document, the presenter may be able to open the document in the virtual meeting application in a pane such as pane 250 of UI screen 200. The document may be a word processing document, a spreadsheet document, an image or any other type of available document. For example, the document may be a CAD document such as the one shown in pane 250.

Once the document is open in the virtual meeting application, the presenter may interact with the document by for example pointing the curser 260 to a specific portion of the document. The other participants may be able to view the interactions in real-time. This may be done by a detecting mechanism utilized to detect changes to the shared screen. The changes may include any user interface elements being added, removed, maximized, minimized and/or changing positions. For example, the detecting mechanism may detect if a new user interface element is being displayed. This may be done, by for example detecting if there is a change in the pixels in the image data. Once changes are detected, updated screen data relating to the change may be captured, processed and transmitted to the server which may in turn transfer those to the other participants such that the change can be replicated on the participant's screens.

This may allow the participants to see any changes to the presenter's screen in real-time, but it does not provide the capability for them to interact with the document. For example, if one of the participants desires to point to a particular portion of the document, there is no way for them to do that other than describing the portion to the presenter and asking them to do so or requesting that the presenter gives them control of the curser 260. Describing the exact location a user desires to point to may prove particularly difficult and time consuming for documents such as crowded drawings and pictures. For example, to point to line 270, the participant may have to provide detailed information about the side of the drawing the line is located at, the direction of the line, what it is connected to, and the like to enable the other participants to locate it. When this needs to occur multiple times during a virtual meeting, a lot of time may be wasted. Furthermore, the process may cause distraction, disrupt the flow of the meeting, and create confusion and frustration. Technical solutions provided here address these issues by enabling each participant to initiate display of gridlines on the shared screen whereby the exact location of a portion can be easily described In addition to buttons 210, 220, and 230, the UI screen 200 may also include a disconnect button 240. The disconnect button 240 may be used during the meeting to end the user's participation in the meeting. This may occur at the end of the meeting or while the meeting is still ongoing. For example, if the user needs to leave early. It should be noted that various other buttons and options may be available to users in different virtual communication applications.

Figure 3A:
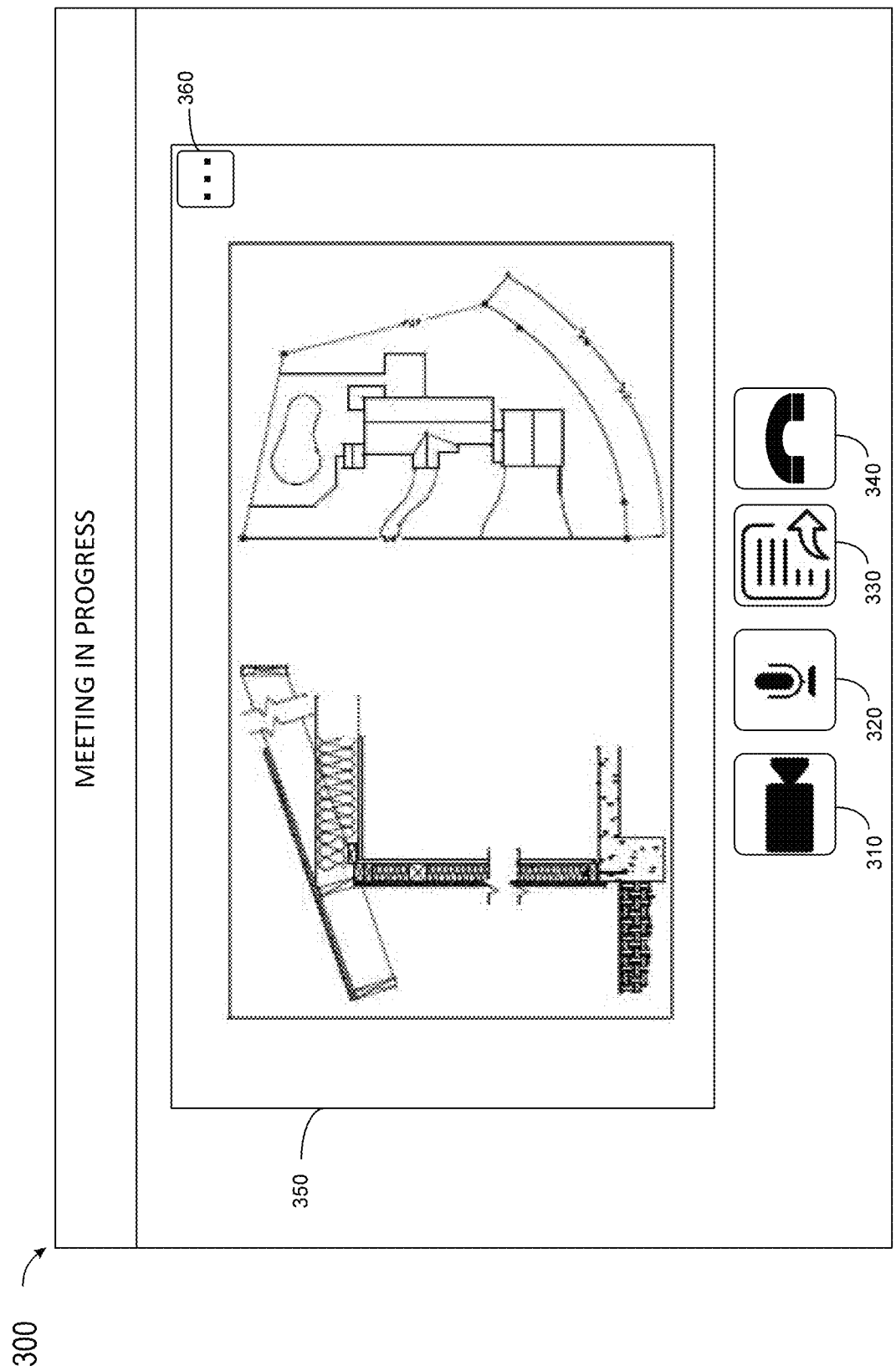
FIGS. 3A-3C depict various example user interfaces for enabling display of gridlines on a shared screen in a virtual communication application according to implementations of the present invention.
Figure 3B:
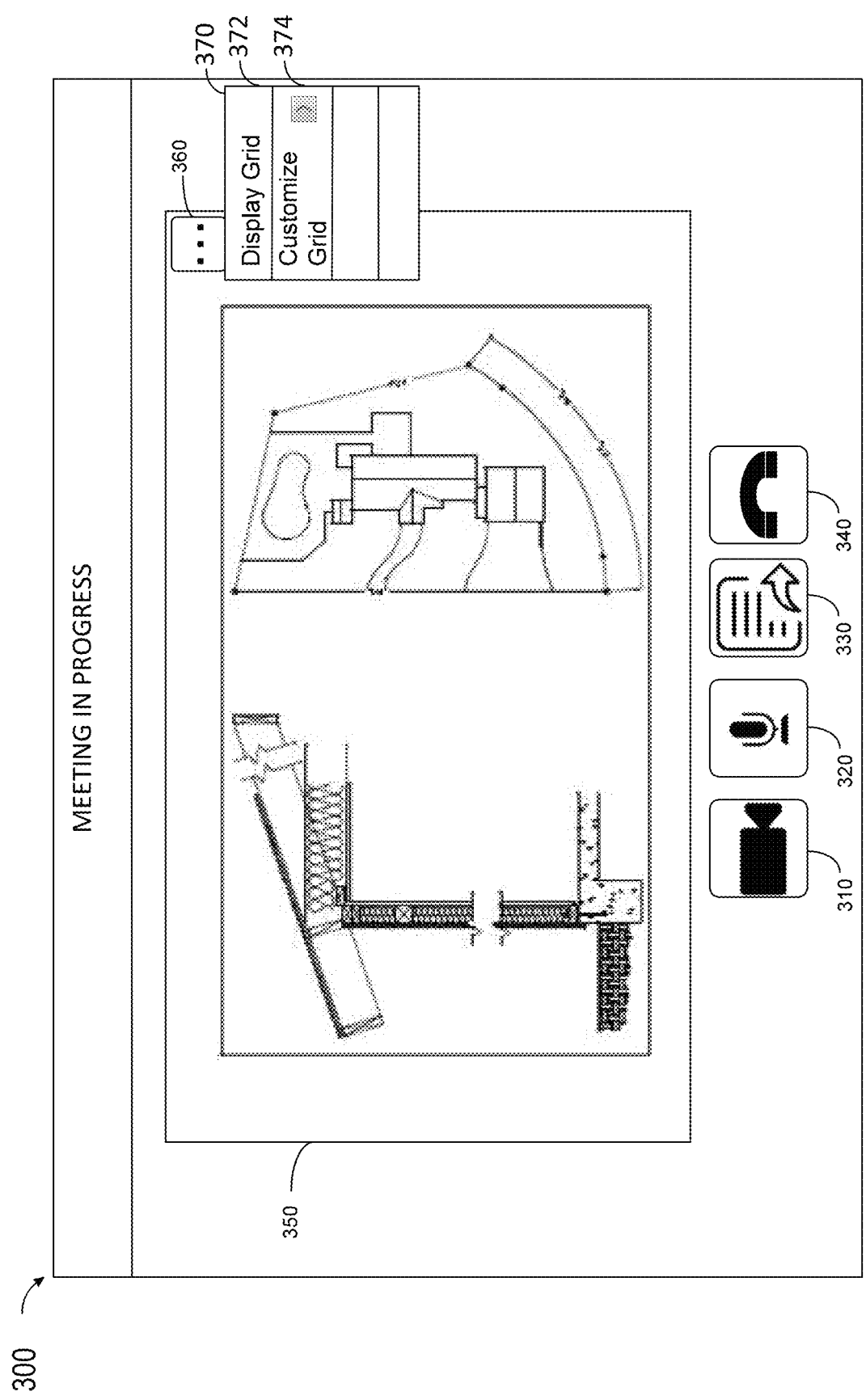
Figure 3C:
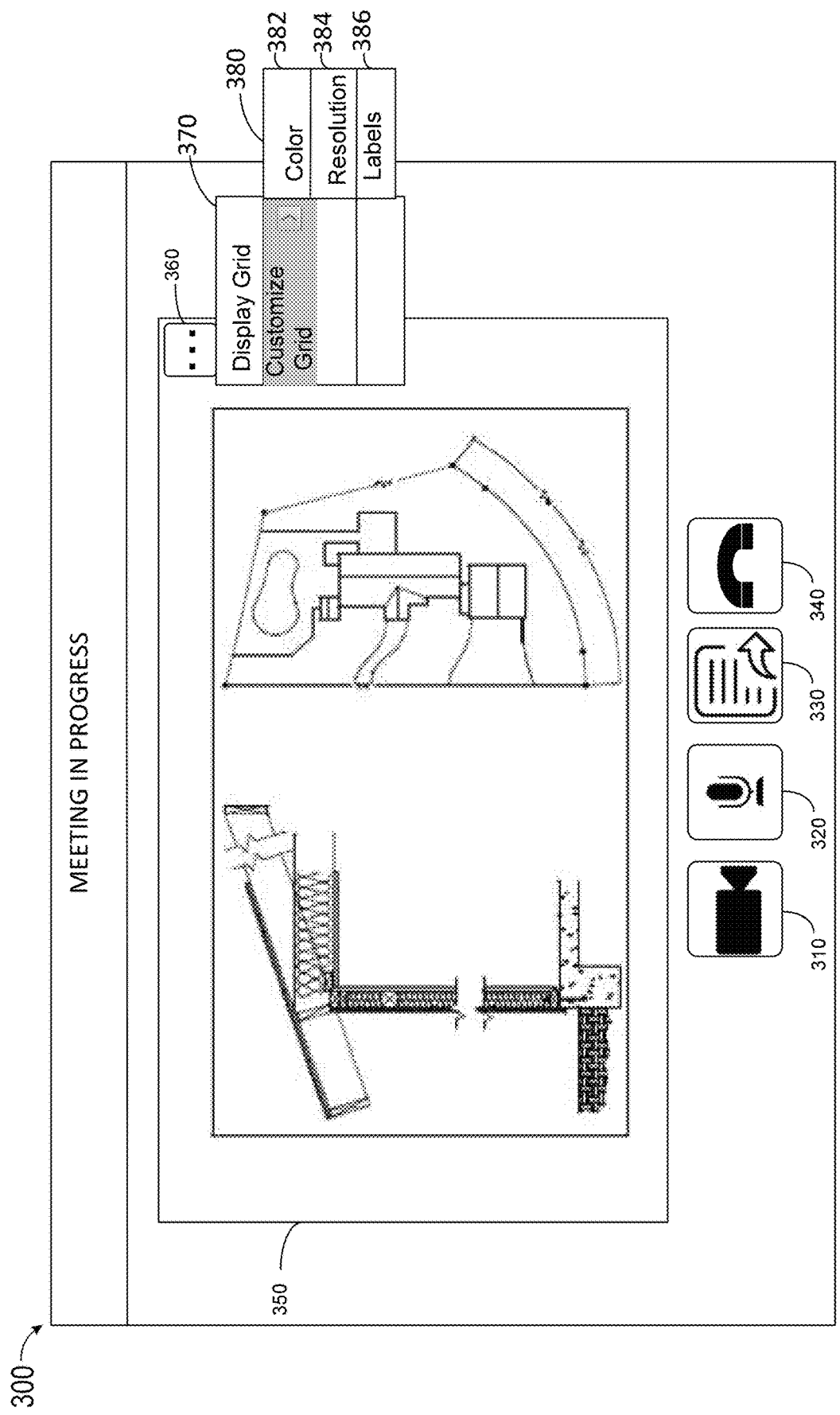

To address the issues discussed above and more, an improved example UI screen, such as the screen 300 depicted in FIGS. 3A-3C, may be presented to participants during a virtual meeting. Similar to the UI screen 200 of FIG. 2, the UI screen 300 may include a button 310 for enabling/disabling video transmissions, a button 320 for enabling/disabling audio signal transmissions, a button 330 for enabling presentation, and a button 340 for disconnecting from the meeting. The buttons 310, 320, 330, 340 may function similarly to those described above with respect to buttons 210, 220, 230 and 240 of FIG. 2. However, once a presenter chooses a document to share during the meeting, an additional control such as the button 360 may be made available via the virtual meeting application or service to provide further options for interacting with the shared screen. In one implementation, the additional control is presented as a button 360 as part of the pane 350 which displays the shared screen. Other configurations are also possible. For example, the toolbar menu, a pop-up menu or any other interactive display element may be used to provide the control via the virtual communication application or service.

The button 360 may be used to provide further options for each participant to customize the shared screen. In one implementation, clicking on the button 360 may cause a context menu 370 to be displayed, as depicted in screen 300 of FIG. 3B. The context menu 370 may include a command 372 for displaying a grid and a command 374 for customizing the grid. Selecting command 372 for displaying a grid may result in overlaying gridlines on the pane 350 as illustrated in FIGS. 4A-4B.

Figure 4A:
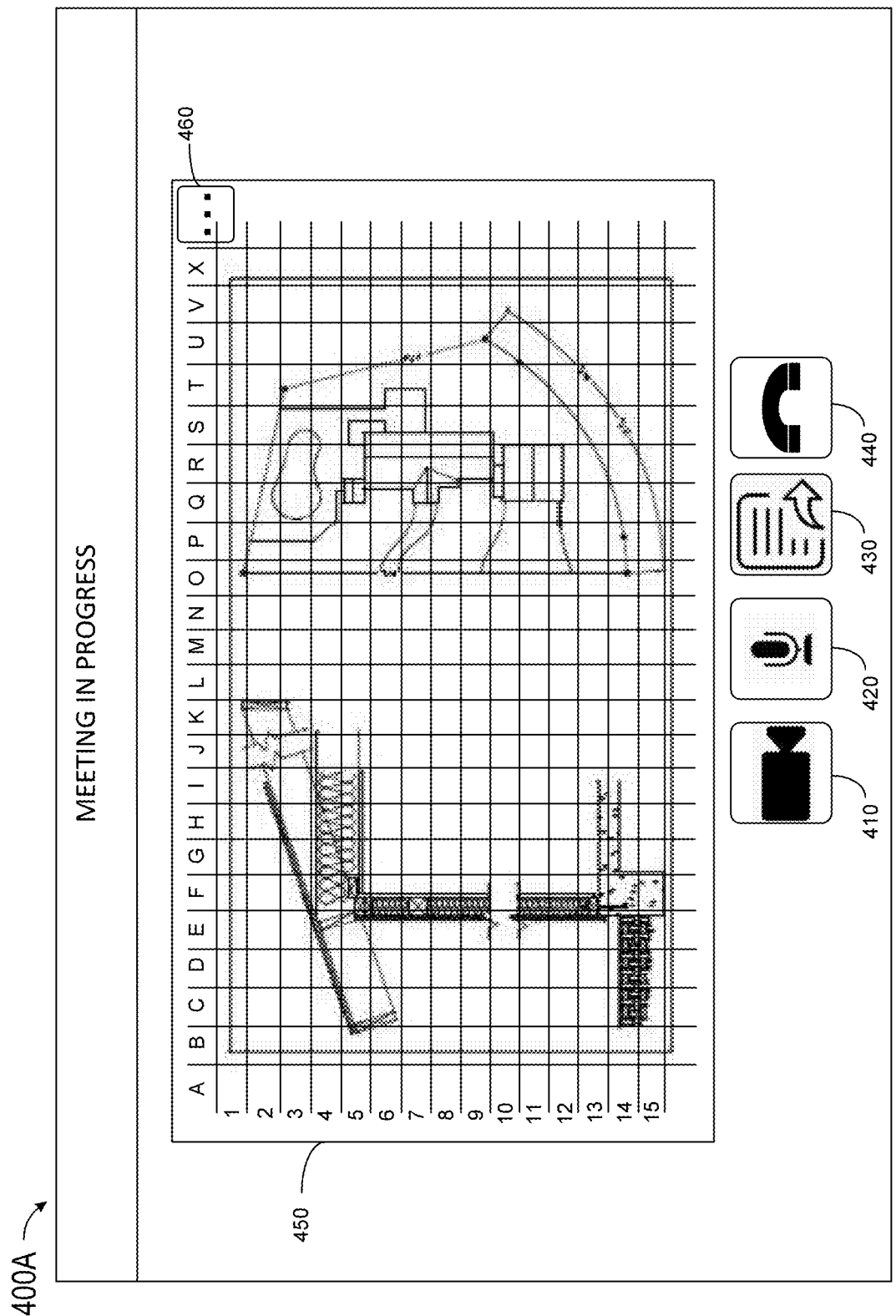

FIG. 4A depicts an improved example UI screen, such as the screen 400A which displays gridlines on the shared screen presented to participants during a virtual communication session. Similar to the UI screen 200 of FIG. 2 and UI screen 300 of FIGS. 3A-3C, UI screen 400 may include a button 410 for enabling/disabling video transmissions, a button 420 for enabling/disabling audio signal transmissions, a button 430 for enabling presentation, and a button 440 for disconnecting from the meeting. The buttons 410, 420, 430, 440 may function similarly to those described above with respect to buttons 210, 220, 230 and 240 of FIG. 2 and button 460 may function similarly to button 360 of FIGS. 3A-3C. However, pane 450 of UI Screen 400 which displays the shared screen may include vertical gridlines A through X and horizontal gridlines 1 through 15. The number and distance of the gridlines may vary depending on the size of the shared screen. Displaying the gridlines may enable a user to easily refer to any point in the shared screen. For example, line 270 of FIG. 2 may be referred to as cell S7 or T7. This provides a quick accurate reference to various locations within the shared screen. Thus, instead of having to describe the location of a point of interest, the user can simply refer to coordinates of the gridlines to easily identify the point.

Display of the gridlines may be achieved by using a layered windows technique to create and manage separate user interface elements within the virtual communication application or service. For example, the gridlines may operate as a separate layer that are superimposed (e.g., positioned on top) on the shared screen at each participant device or provided via the virtual communication service for devices that utilize the online service. In this manner, any data relating to the presenter's curser position and activities may still be received and updated on each participant's screen while the gridlines are being displayed. For devices that utilize a local virtual communication application, minimal transfer of data may be required to enable display of the gridlines. For example, virtual communication application may include features enabling the application to display and overlay the gridlines on top of the shared screen. As a result, the participant device at which the instruction to display the gridlines is received (originating device) may simply begin displaying the gridlines upon receiving the user input. For the other participant devices to begin displaying the gridlines, an instruction may need to be sent to from the originating device to the server which may in turn transfer the instruction to each device participating in the virtual communication session. This may require minimal use of resources (e.g., bandwidth) and as such can be performed quickly and efficiently, and may not adversely affect the quality of the virtual communication session (e.g., cause delays in signal transmission and the like). As such, the gridlines can be turned on and off quickly as needed.

Referring back to FIG. 3B, selecting the command 374 for customizing the grid may result in displaying a submenu such as context menu 380 of FIG. 3C. In one implementation, selecting the command 374 for customizing the grid may occur after a grid has been displayed. For example, a user may choose to display gridlines first, and once the gridlines are overlaid on the shared screen, may determine that the color is difficult to see. At this point, the user may select the command 374 to customize the gridlines by changing the color. Alternatively or additionally, the user may choose to customize the gridlines before they are displayed, for example, based on experience.

Once the options for customizing the grid are displayed, the participant may select the command 382 to change the color of the gridlines, command 384 to change the resolution (e.g., distance between gridlines) or command 386 to customize the labels. In an example, selecting the command 382 to change the color may cause a pop-up menu (or any other UI element) to be displayed that provides a color wheel (or color table) where various colors may be chosen for the gridlines. This may be particularly useful when the standard color used for the gridlines is difficult to see on the shared screen.

Selecting the command 384, on the other hand, may present an option for selecting the size of the grid. For example, the user may be able to select the number of vertical gridlines and/or the number of horizontal gridlines to display. Alternatively, a number of predetermined gridline resolutions (e.g., 10 by 10, 20 by 20, etc.) may be provided to choose from. This could be useful when the standard resolution provided does not provide optimal results. For example, for a highly crowded shared screen, a 10 by 10 grid may not allow the participant to pinpoint the exact location of a desired point of interest. In such an instance, the gridline resolution may need to be changed to 15 by 15 or 20 by 20.

On the other hand, for a sparsely crowded shared screen a standard 10 by 10 grid may be unnecessary. As a result, the resolution may need to be changed to display fewer lines.

Choosing the command 386 may allow a participant to customize the labels. For example, for a shared screen with a substantial amount of writing on the top, the alphabet labels on the top may be difficult to see. As a result, the participant may choose to switch the labels to display alphabets on the side and number on the side. Various other options are possible. It should be noted that any other parameter of the gridlines may be customizable. In one implementation, any participant may be able to customize the gridlines. For example, a first participant may enable the display of gridlines and a second participant may decide to customize the gridlines by changing the color. In each instance, the changes made may be shown on all other shared screens. Alternatively, a participant may be able to customize one or more parameters of the gridlines for their individual purposes. For example, a participant that cannot see a particular color well may choose the change the color of the gridlines to suit their needs. This may be achieved by for example, checking a box or presenting a pop-up message that asks if the changes should be made across all participant devices or only the local device.

In one implementation, once the grid is displayed on the shared screen, the context menu may be changed to enable removal of the grids. This is depicted in FIG. 4B which illustrates an improved example UI screen, such as the screen 400B displaying gridlines on the shared screen presented to participants during a virtual communication session. Since UI screen 400B is already displaying gridlines on the pane 450, selecting the UI control 460 may display the context menu 470 which includes a command 472 for removing the grid. Thus, the UI controls provided to the user of the virtual communication mechanism can be changed automatically based on the user's needs and interactions with the UI. As a result, context menu 470 may include the command 472 for removing the grid, command 474 for customizing the grid and command 476 for removing the grid from the user's screen.

The command 472 of context menu 470 may be used to remove the grids after participants have achieved their purpose of pinpointing one or more locations on the screen. By allowing the grids to be easily removed, the virtual communication application provides a quick and efficient mechanism for achieving the purpose of pinpointing a desired location without interfering with the remainder of a presentation. Selecting the command 472 for removing the grid may remove the grid for all participant's screen.

In one implementation, each participant may have the ability to turn the grid on and off only on their screen. For example, menu 470 may provide an option such as the command 476 for removing the grid from the user's screen. This may be useful in instances when a user prefers to remove the grid from his screen when they are being displayed for the group. Enabling the participant to display the grid on his/her screen only may also be helpful in situations where a user needs to view the gridlines for his/her own purposes.

Figure 5:
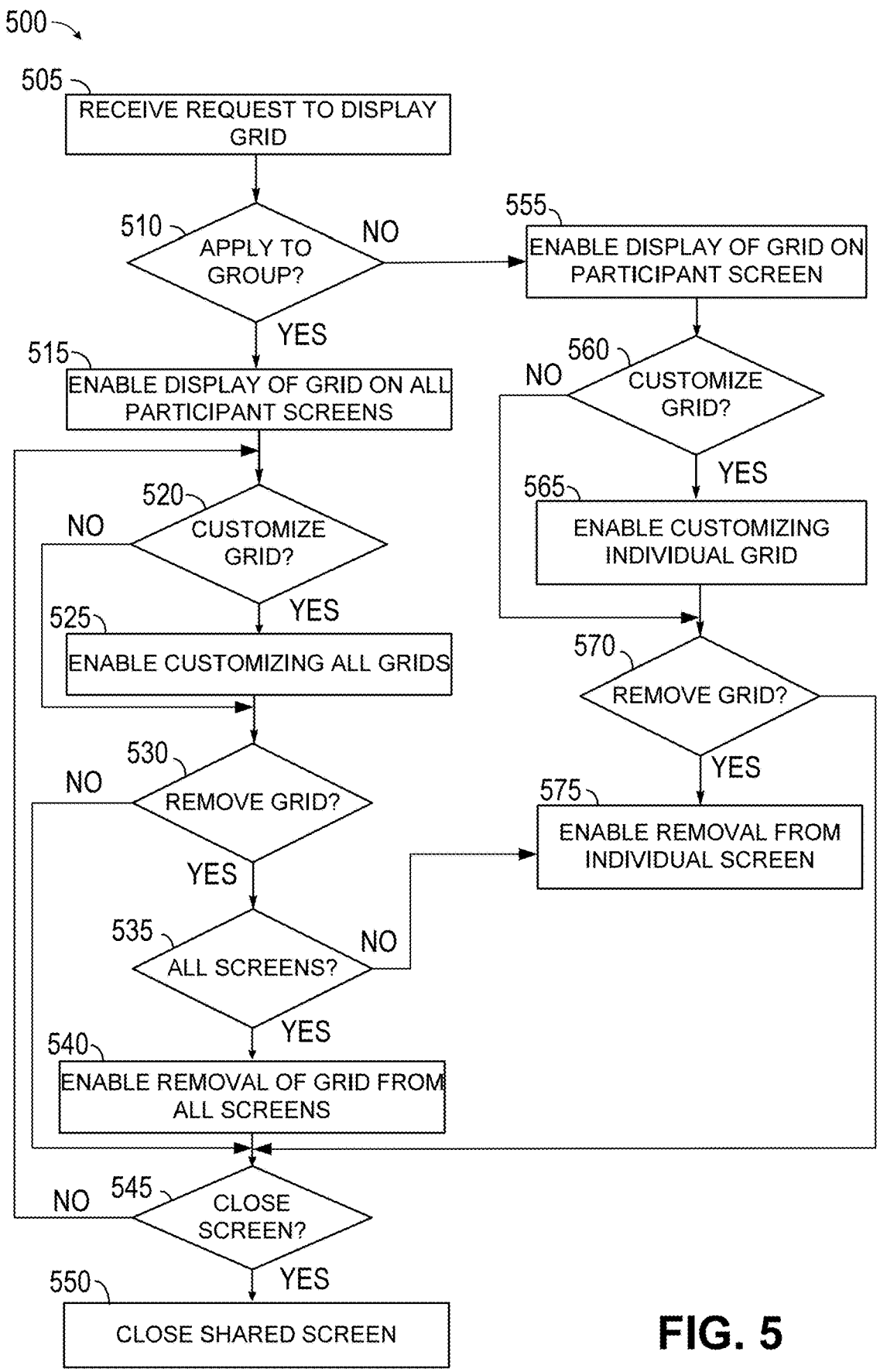
FIG. 5 is a flow diagram showing an example method for enabling display of gridlines on a shared screen during a virtual communication session.

FIG. 5 is a flow diagram depicting an example method 500 for enabling display of a grid on a shared screen during a virtual communication session. At 505, method 500 may begin by receiving a request from a meeting attendee (e.g. a client device connected to the server via a virtual meeting application) to initiate display of grids on a shared screen during a virtual communication session such as a virtual meeting. This may occur, for example, when one of the attendees presses a display grid menu button on their screen. Thus, the request may be received via an input/output element of a participant client device.

Upon receiving the request, method 500 may determine, at 510, if the request is for applying the grid to all shared screens (e.g., shared screens displayed on all participant screens) or only for the participant from which the request was received. When it is determined, that the request was for applying the grid to all screens, method 500 may proceed to enable display of grids on each participant screen. This may be done by first sending a request from the requesting device to the server responsible for managing the virtual communication session. The request may simply be a message indicating that a standard grid should be displayed on each shared screen. Alternatively, the message may also include parameters for the grid. For example, if prior to requesting the display of the grid, the requesting user had customized the grid, those parameters may have been stored in the user's profile and may now be included in the message to dictate how the grid should be displayed on each screen. Whether the message only includes a request or a request along with identified parameters, it may still be a small message requiring minimal bandwidth. As a result, the amount of resources required for initiating the display of a grids on shared screen may be minimal.

Once received by the server, the message may be transmitted to each participant device which uses its own local virtual communication application to connect to the communication session. The local virtual communication application may then create and display the grid by overlaying the grid on the shared screen layer of the user interface. For devices that utilize the online virtual communication service, the server may simply initiate the process of creating and overlaying the grid on the shared screen displayed via the online service. In one implementation, the requesting device (e.g., the device from which the request to display the grid was initiated) may simply display the grid as soon as the user's input is received. Alternatively, if the requesting device utilizes the online service, then the message may first be sent to the server, which will in turn enable display of the grid on all devices utilizing the online service. In either case, upon determining that the request is for all participants, method 500 may proceed to enable display of grid on all participant screens, at 515.

Once the grid is displayed on all devices, a participant may decide that that one or more parameters of the grid should be adjusted to better utilize the grid. As a result, a participant may utilize the virtual communication application or service to customize the grid. Thus, method 500 may determine, at 520, whether a request to customize the grid has been received. In an example, the request may be received via an input/output element of one of the participant devices and may be transferred subsequently via the virtual communication application or service to the server. The request to customize the grid may include the parameters changed and how they were changed.

When it is determined, that a request to customize the grid has been received, method 500 may proceed enable customizing the grid, at 525. This may be done by transferring the request to change the parameters to each participant device that utilizes their own local virtual communication application. The local virtual communication application or online service may then be used to change the display parameters of the grid before the grid is overlaid on the underlying shared screen. Once the customizations have been made or after it is determined at 520 that a request to customize the grid has not been received, method 500 may proceed to determine, at 530, if a request to remove the grid has been received. This is because, the grid may need to be used by one or more participants for a portion of the communication session to bring attention to one or more sections of the shared screen. Once the desired discussion is complete, the participants may choose to remove the grid for better viewing of the shared screen.

When it is determined, at 530, that a request to remove the grid has been received, method 500 may proceed to determine if the request is for local removal from one device or for removing the grid from all participant devices, at 535. If it is determined that the request to remove the grid is for all participant devices, method 500 may proceed to enable removal of the grid from all participant devices, at 540. This may be done by receiving a request to remove the grid at a client device, transmitting the request to the server, and then transferring the request to each client device that utilizes its own local virtual communication application and removing the grid for devices that utilize the online service. The local virtual communication application at each device may then receive the request and process it by stopping to display the grid.

When it is determined, at 530, that a request to remove the grid has not been received, of after enabling removal of the grid at 540, method 500 may proceed to determine, at 545, if a request to close the shared screen has been received. This may occur once the presenter decides is finished with his/her presentation or once the virtual communication session is over. If it is determined that a request to close the shared screen is received, then method 500 may proceed to close the shared screen on each participant device, at 550. When it is determined, however, that a request to close the screen has not been received, method 500 may return to step 520 to determine if a request to customize the grid has been received and proceed through the steps of the method again until a request to close the screen is received.

Referring back to step 510, when it is determined that the request to apply the grid is only for the device from which the request was received, method 500 may proceed to enable display of the grid on the requesting device's screen, at 555. This may simply involve utilizing the local virtual communication application to create and apply the grid to the shared screen displayed by the virtual communication application. Alternatively, if the requesting device is utilizing the online service, then the request may be transferred to the server, which may in turn create and enable display of the grid on the shared screen of the requesters local UI.

After the grid is displayed on the requester's screen, method 500 may proceed to determine if a request to customize the grid has been received, at 560. When a request to customize the grid is received, method 500 may proceed to enable customizing the grid, at 565, by either simply using the received user input via the local virtual communication application to customize the grid or sending the request to the server to perform the customization if the device utilizes the online service.

When it is determined, at 560, that a request to customize the grid has not been received, or after the customization is performed, method 500 may proceed to determine, at 570, if a request to remove the grid has been received from the user. When a request is received, method 500 may proceed to enable removal of the grid from the user's screen, at 575, by either using the local virtual communication application to remove the grid or sending the request to the server to perform the removal if the device utilizes the online service. If, however, it is determined that no request to remove the grid has been received, method 500 may proceed to step 545 to determine if a request to close the screen has been received.

It should be noted that the mechanism for displaying gridlines on the shared screen is different from that for displaying grids by a native application when the shared screen is displaying a document using a native application. For example, if the shared screen is displaying a word processing document which utilizes an application such as Microsoft Word®, the process of displaying the grid during the virtual communication session is fundamentally different from any functionalities available for displaying a grid on the document available via the Microsoft Word application. That is because not all applications used to display a shared document have the capability to display grid. For example, most applications that display an image do not offer such a functionality. Furthermore, even if the functionality is available, it may only be initiated by the presenter who has access to the underlying native program. If a different participant desires to point to a section, they would then need to request that the presenter display initiate display of the grid. This could take valuable time away from the meeting and cause distraction. Furthermore, since the grid data would need to be sent as part of the shared screen (e.g., image data) the change may require substantially more bandwidth than required by the example mechanisms disclosed herein in which only a request to display a grid may need to be sent.

Thus, in different implementations, an improved method and system may be provided to enable enhanced interactions with a shared screen during a virtual communication session. The enhanced interactions may enable display of a grid on a shared screen to allow a participant to quickly and efficiently point to a portion of the shared screen when needed. The request to display the grid may be received and/or processed by the virtual communication application or service via for example a control provided on a user interface of the application or service.

Figure 6:
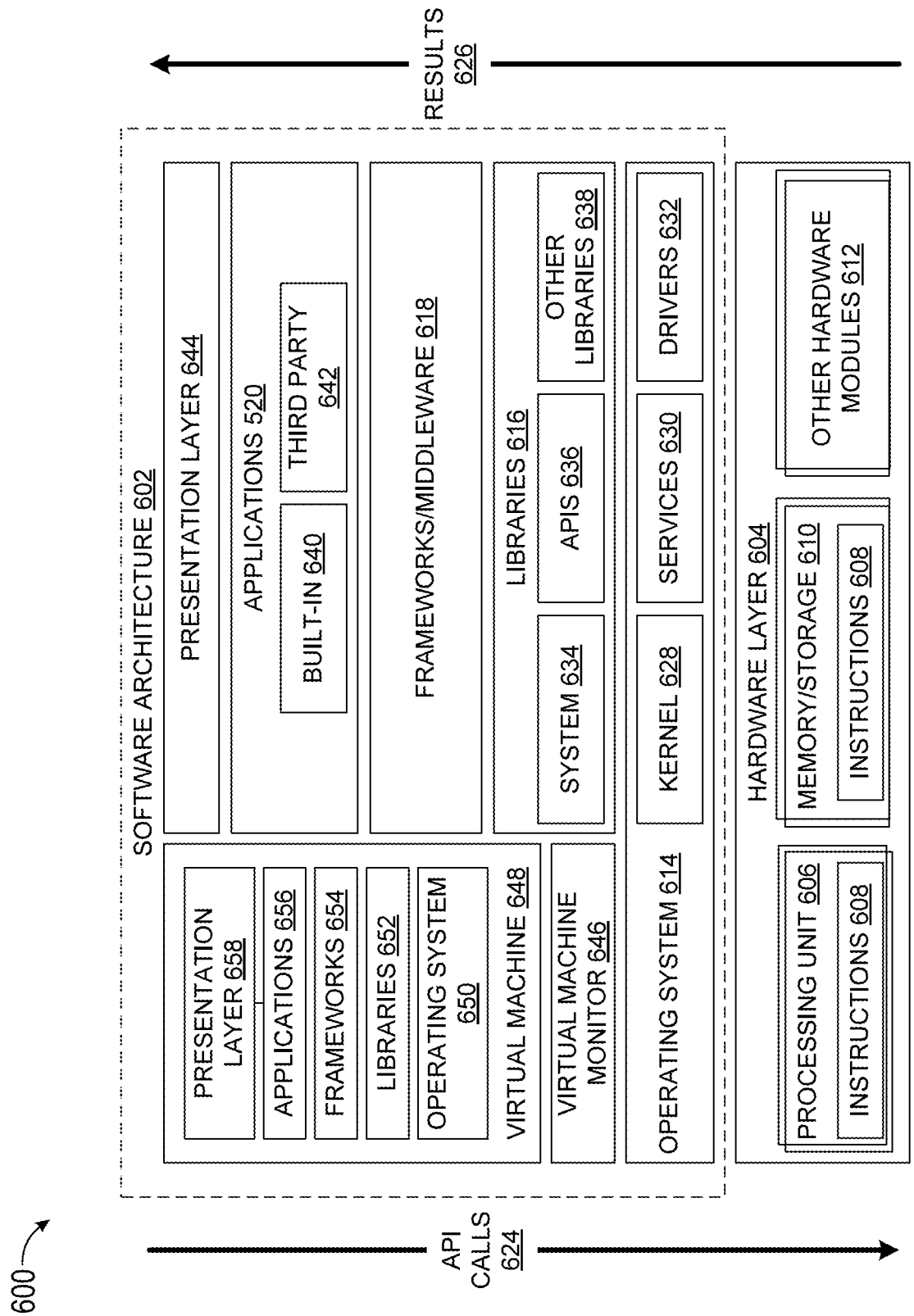
FIG. 6 is a block diagram illustrating an example software architecture, various portions of which may be used in conjunction with various hardware architectures herein described.

FIG. 6 is a block diagram 600 illustrating an example software architecture 602, various portions of which may be used in conjunction with various hardware architectures herein described, which may implement any of the above-described features. FIG. 6 is a non-limiting example of a software architecture and it will be appreciated that many other architectures may be implemented to facilitate the functionality described herein. The software architecture 602 may execute on hardware such as client devices, native application provider, web servers, server clusters, external services, and other servers. A representative hardware layer 604 includes a processing unit 606 and associated executable instructions 608. The executable instructions 608 represent executable instructions of the software architecture 602, including implementation of the methods, modules and so forth described herein.

The hardware layer 604 also includes a memory/storage 610, which also includes the executable instructions 608 and accompanying data. The hardware layer 604 may also include other hardware modules 612. Instructions 608 held by processing unit 608 may be portions of instructions 608 held by the memory/storage 610.

The example software architecture 602 may be conceptualized as layers, each providing various functionality. For example, the software architecture 602 may include layers and components such as an operating system (OS) 614, libraries 616, frameworks 618, applications 620, and a presentation layer 624. Operationally, the applications 620 and/or other components within the layers may invoke API calls 624 to other layers and receive corresponding results 626. The layers illustrated are representative in nature and other software architectures may include additional or different layers. For example, some mobile or special purpose operating systems may not provide the frameworks/middleware 618.

The OS 614 may manage hardware resources and provide common services. The OS 614 may include, for example, a kernel 628, services 630, and drivers 632. The kernel 628 may act as an abstraction layer between the hardware layer 604 and other software layers. For example, the kernel 628 may be responsible for memory management, processor management (for example, scheduling), component management, networking, security settings, and so on. The services 630 may provide other common services for the other software layers. The drivers 632 may be responsible for controlling or interfacing with the underlying hardware layer 604. For instance, the drivers 632 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 616 may provide a common infrastructure that may be used by the applications 620 and/or other components and/or layers. The libraries 616 typically provide functionality for use by other software modules to perform tasks, rather than rather than interacting directly with the OS 614. The libraries 616 may include system libraries 634 (for example, C standard library) that may provide functions such as memory allocation, string manipulation, file operations. In addition, the libraries 616 may include API libraries 636 such as media libraries (for example, supporting presentation and manipulation of image, sound, and/or video data formats), graphics libraries (for example, an OpenGL library for rendering 2D and 3D graphics on a display), database libraries (for example, SQLite® or other relational database functions), and web libraries (for example, WebKit® that may provide web browsing functionality). The libraries 616 may also include a wide variety of other libraries 638 to provide many functions for applications 620 and other software modules.

The frameworks 618 (also sometimes referred to as middleware) provide a higher-level common infrastructure that may be used by the applications 620 and/or other software modules. For example, the frameworks 618 may provide various graphic user interface (GUI) functions, high-level resource management, or high-level location services. The frameworks 618 may provide a broad spectrum of other APIs for applications 620 and/or other software modules.

The applications 620 include built-in applications 620 and/or third-party applications 622. Examples of built-in applications 620 may include, but are not limited to, a contacts application, a browser application, a location application, a media application, a messaging application, and/or a game application. Third-party applications 622 may include any applications developed by an entity other than the vendor of the particular system. The applications 620 may use functions available via OS 614, libraries 616, frameworks 618, and presentation layer 624 to create user interfaces to interact with users.

Some software architectures use virtual machines, as illustrated by a virtual machine 628. The virtual machine 628 provides an execution environment where applications/modules can execute as if they were executing on a hardware machine (such as the machine 600 of FIG. 6, for example). The virtual machine 628 may be hosted by a host OS (for example, OS 614) or hypervisor, and may have a virtual machine monitor 626 which manages operation of the virtual machine 628 and interoperation with the host operating system. A software architecture, which may be different from software architecture 602 outside of the virtual machine, executes within the virtual machine 628 such as an OS 650, libraries 652, frameworks 654, applications 656, and/or a presentation layer 658.

Figure 7:
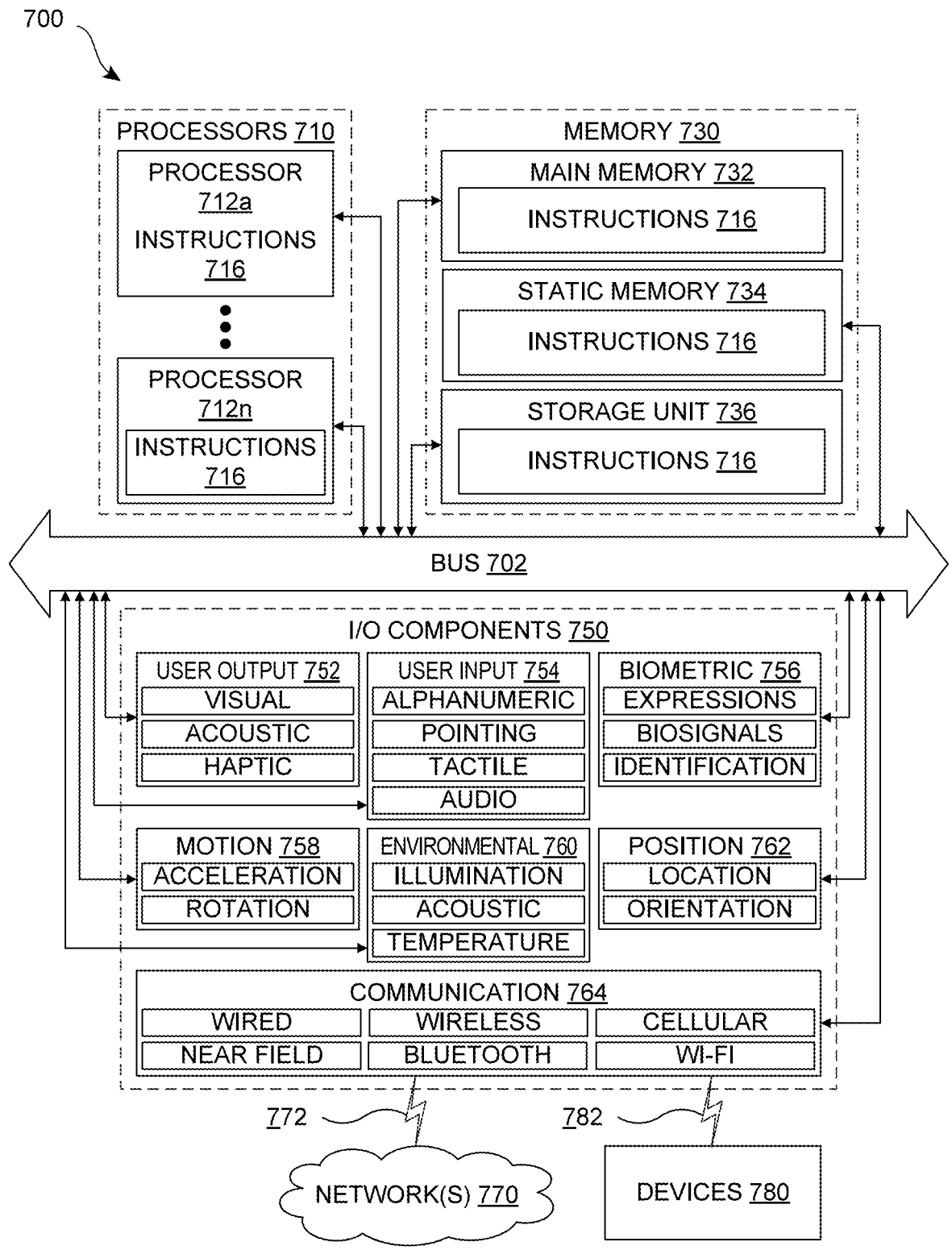
FIG. 7 is a block diagram illustrating components of an example machine configured to read instructions from a machine-readable medium and perform any of the features described herein.

FIG. 7 is a block diagram illustrating components of an example machine 700 configured to read instructions from a machine-readable medium (for example, a machine-readable storage medium) and perform any of the features described herein. The example machine 700 is in a form of a computer system, within which instructions 716 (for example, in the form of software components) for causing the machine 700 to perform any of the features described herein may be executed. As such, the instructions 716 may be used to implement methods or components described herein. The instructions 716 cause unprogrammed and/or unconfigured machine 700 to operate as a particular machine configured to carry out the described features. The machine 700 may be configured to operate as a standalone device or may be coupled (for example, networked) to other machines. In a networked deployment, the machine 700 may operate in the capacity of a server machine or a client machine in a server-client network environment, or as a node in a peer-to-peer or distributed network environment. Machine 700 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 700 is illustrated, the term "machine" includes a collection of machines that individually or jointly execute the instructions 716.

The machine 700 may include processors 710, memory 730, and I/O components 750, which may be communicatively coupled via, for example, a bus 702. The bus 702 may include multiple buses coupling various elements of machine 700 via various bus technologies and protocols. In an example, the processors 710 (including, for example, a central processing unit (CPU), a graphics processing unit (GPU), a digital signal processor (DSP), an ASIC, or a suitable combination thereof) may include one or more processors 712a to 712n that may execute the instructions 716 and process data. In some examples, one or more processors 710 may execute instructions provided or identified by one or more other processors 710. The term "processor" includes a multi-core processor including cores that may execute instructions contemporaneously. Although FIG. 7 shows multiple processors, the machine 700 may include a single processor with a single core, a single processor with multiple cores (for example, a multi-core processor), multiple processors each with a single core, multiple processors each with multiple cores, or any combination thereof. In some examples, the machine 700 may include multiple processors distributed among multiple machines.

The memory/storage 730 may include a main memory 732, a static memory 734, or other memory, and a storage unit 736, both accessible to the processors 710 such as via the bus 702. The storage unit 736 and memory 732, 734 store instructions 716 embodying any one or more of the functions described herein. The memory/storage 730 may also store temporary, intermediate, and/or long-term data for processors 710. The instructions 716 may also reside, completely or partially, within the memory 732, 734, within the storage unit 736, within at least one of the processors 710 (for example, within a command buffer or cache memory), within memory at least one of I/O components 750, or any suitable combination thereof, during execution thereof. Accordingly, the memory 732, 734, the storage unit 736, memory in processors 710, and memory in I/O components 750 are examples of machine-readable media.

As used herein, "machine-readable medium" refers to a device able to temporarily or permanently store instructions and data that cause machine 700 to operate in a specific fashion. The term "machine-readable medium," as used herein, does not encompass transitory electrical or electromagnetic signals per se (such as on a carrier wave propagating through a medium); the term "machine-readable medium" may therefore be considered tangible and non-transitory. Non-limiting examples of a non-transitory, tangible machine-readable medium may include, but are not limited to, nonvolatile memory (such as flash memory or read-only memory (ROM)), volatile memory (such as a static random-access memory (RAM) or a dynamic RAM), buffer memory, cache memory, optical storage media, magnetic storage media and devices, network-accessible or cloud storage, other types of storage, and/or any suitable combination thereof. The term "machine-readable medium" applies to a single medium, or combination of multiple media, used to store instructions (for example, instructions 716) for execution by a machine 700 such that the instructions, when executed by one or more processors 710 of the machine 700, cause the machine 700 to perform and one or more of the features described herein. Accordingly, a "machine-readable medium" may refer to a single storage device, as well as "cloud-based" storage systems or storage networks that include multiple storage apparatus or devices.

The I/O components 750 may include a wide variety of hardware components adapted to receive input, provide output, produce output, transmit information, exchange information, capture measurements, and so on. The specific I/O components 750 included in a particular machine will depend on the type and/or function of the machine. For example, mobile devices such as mobile phones may include a touch input device, whereas a headless server or IoT device may not include such a touch input device. The particular examples of I/O components illustrated in FIG. 7 are in no way limiting, and other types of components may be included in machine 700. The grouping of I/O components 750 are merely for simplifying this discussion, and the grouping is in no way limiting. In various examples, the I/O components 750 may include user output components 752 and user input components 754. User output components 752 may include, for example, display components for displaying information (for example, a liquid crystal display (LCD) or a projector), acoustic components (for example, speakers), haptic components (for example, a vibratory motor or force-feedback device), and/or other signal generators. User input components 754 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 750 may include biometric components 756 and/or position components 762, among a wide array of other environmental sensor components. The biometric components 756 may include, for example, components to detect body expressions (for example, facial expressions, vocal expressions, hand or body gestures, or eye tracking), measure biosignals (for example, heart rate or brain waves), and identify a person (for example, via voice-, retina-, and/or facial-based identification). The position components 762 may include, for example, location sensors (for example, a Global Position System (GPS) receiver), altitude sensors (for example, an air pressure sensor from which altitude may be derived), and/or orientation sensors (for example, magnetometers).

The I/O components 750 may include communication components 764, implementing a wide variety of technologies operable to couple the machine 700 to network(s) 770 and/or device(s) 780 via respective communicative couplings 772 and 782. The communication components 764 may include one or more network interface components or other suitable devices to interface with the network(s) 770. The communication components 764 may include, for example, components adapted to provide wired communication, wireless communication, cellular communication, Near Field Communication (NFC), Bluetooth® communication, Wi-Fi, and/or communication via other modalities. The device(s) 780 may include other machines or various peripheral devices (for example, coupled via USB).

In some examples, the communication components 764 may detect identifiers or include components adapted to detect identifiers. For example, the communication components 664 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 762, such as, but not limited to, geo-location via Internet Protocol (IP) address, location via Wi-Fi, cellular, NFC, Bluetooth®, or other wireless station identification and/or signal triangulation.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

Generally, functions described herein (for example, the features illustrated in FIGS. 1-5) can be implemented using software, firmware, hardware (for example, fixed logic, finite state machines, and/or other circuits), or a combination of these implementations. In the case of a software implementation, program code performs specified tasks when executed on a processor (for example, a CPU or CPUs). The program code can be stored in one or more machine-readable memory devices. The features of the techniques described herein are system-independent, meaning that the techniques may be implemented on a variety of computing systems having a variety of processors. For example, implementations may include an entity (for example, software) that causes hardware to perform operations, e.g., processors functional blocks, and so on. For example, a hardware device may include a machine-readable medium that may be configured to maintain instructions that cause the hardware device, including an operating system executed thereon and associated hardware, to perform operations. Thus, the instructions may function to configure an operating system and associated hardware to perform the operations and thereby configure or otherwise adapt a hardware device to perform functions described above. The instructions may be provided by the machine-readable medium through a variety of different configurations to hardware elements that execute the instructions.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows, and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein.

Relational terms such as first and second and the like may be used solely to distinguish one entity or action from another without necessarily requiring or implying any actual such relationship or order between such entities or actions. The terms "comprises," "comprising," and any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that comprises the element.

The Abstract of the Disclosure is provided to allow the reader to quickly identify the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that any claim requires more features than the claim expressly recites. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A data processing system comprising:
a processor; and
a computer-readable medium in communication with the processor, the computer-readable medium storing executable instructions that, when executed by the processor, cause the data processing system to perform:
causing a shared screen for a virtual meeting between first and second devices to be displayed at a portion of a user interface of the first and second devices;
while the shared screen is being displayed via the user interface of the first and second devices during the virtual meeting, receiving, via a first control of the user interface of the first or second device, a request to display gridlines on the shared screen displayed at the first and second devices, wherein the first control of the user interface is an option provided by a virtual communication environment via which the virtual meeting between the first and second devices is established; and
in response to receiving the request to display the gridlines on the shared screen, causing the gridlines to be displayed on the shared screen displayed at the first and second devices during the virtual meeting.

2. The data processing system of claim 1, wherein the virtual communication environment is rendered by a virtual meeting application.

3. The data processing system of claim 1, wherein the executable instructions, when executed by the processor, further cause the data processing system to perform:
receiving, via the first or second device, a request to adjust a parameter of the gridlines; and
in response to receiving the request to adjust the parameter of the gridlines, adjusting the parameter on the shared screen displayed at the first and the second devices.

4. The data processing system of claim 1, wherein, for causing the gridlines to be displayed on the shared screen, the instructions, when executed by the processor, further cause the processor to control the data processing system to perform sending, to the first and second devices via a communication network, a request to display the gridlines on the shared screen displayed at the first and second devices.

5. The data processing system of claim 1, wherein, for causing the gridlines to be displayed on the shared screen, the instructions, when executed by the processor, further cause the processor to control the data processing system to perform sending, to the first and second devices via a communication network, a request to overlay the gridlines on the shared screen displayed at the first and second devices.

6. The data processing system of claim 1, wherein the executable instructions, when executed by the processor, further cause the data processing system to perform functions of:
receiving a request to stop displaying the gridlines; and
in response to receiving the request to stop displaying the gridlines, causing the gridlines to be removed from the shared screen displayed at the first and the second devices.

7. The data processing system of claim 6, wherein the request to stop displaying the gridlines is received via a second control of the user interface of the first or second device.

8. The data processing system of claim 6, wherein the request to stop displaying the gridlines is received from the first or the second devices.

9. A method of operating a data processing system for causing gridlines to be displayed on a shared screen of a plurality of devices during a virtual meeting, the method comprising:
causing a shared screen for a virtual meeting between first and second devices to be displayed at a portion of a user interface of the first and second devices;
while the shared screen is being displayed via the user interface of the first and second devices during the virtual meeting, receiving, via a first control of the user interface of the first or second device, a request to display gridlines on the shared screen displayed at the first and second devices, wherein the first control of the user interface is an option provided by a virtual communication environment via which the virtual meeting between the first and second devices is established; and
in response to receiving the request to display the gridlines on the shared screen, causing the gridlines on the shared screen displayed at the first and second devices during the virtual meeting.

10. The method of claim 9, wherein the first control comprises a user input to activate a menu option for displaying the gridlines, the menu option provided by the virtual communication environment.

11. The method of claim 9, further comprising:
receiving, via the first or second device, a request to adjust a parameter of the gridlines; and
in response to receiving the request to adjust the parameter of the gridlines, adjusting the parameter on the shared screen displayed at the first and the second devices.

12. The method of claim 9, wherein causing the gridlines to be displayed on the shared screen comprises sending, to the first and second devices via a communication network, a request to display the gridlines on the shared screen displayed at the first and the second devices.

13. The method of claim 9, further comprising:
receiving a request to stop displaying the gridlines; and
in response to receiving the request to stop displaying the gridlines, causing the gridlines to be removed from the shared screen displayed at the first and the second devices.

14. The method of claim 9, wherein causing the gridlines to be displayed on the shared screen comprises sending, to the first and second devices via a communication network, a request to overlay the gridlines on the shared screen displayed at the first and second devices.

15. A non-transitory computer readable medium on which are stored instructions that, when executed by a processor, cause the processor to control a programmable device to perform:
causing a shared screen for a virtual meeting between first and second devices to be displayed at a portion of a user interface of the first and second devices;
while the shared screen is being displayed via the user interface of the first and second devices during the virtual meeting, receiving, via a first control of the user interface of the first or second device, a request to display gridlines on the shared screen displayed at the first and second devices, wherein the first control of the user interface is an option provided by a virtual communication environment via which the virtual meeting between the first and second devices is established; and
in response to receiving the request to display the gridlines on the shared screen, causing the gridlines to be displayed on the shared screen displayed at the first and second devices during the virtual meeting.

16. The non-transitory computer readable medium of claim 15, wherein the first control comprises a use input to activate a menu option for displaying the gridlines, the menu option provided by the virtual communication environment.

17. The non-transitory computer readable medium of claim 15, wherein the instructions further cause the processor to control the programmable device to perform:
receiving, via the first or second device, a request to adjust a parameter of the gridlines; and
in response to receiving the request to adjust the parameter of the gridlines, adjusting the parameter on the shared screen displayed at the first and the second devices.

18. The non-transitory computer readable medium of claim 15, wherein the virtual communication environment is rendered by a virtual meeting application.

19. The non-transitory computer readable medium of claim 15, wherein the instructions further cause the processor to control the programmable device to perform:
receiving a request to stop displaying the gridlines; and
in response to receiving the request to stop displaying the gridlines, causing the gridlines to be removed from the shared screen displayed at the first and the second devices.

20. The non-transitory computer readable medium of claim 15, wherein, for causing the gridlines to be displayed on the shared screen, the instructions, when executed by the processor, further cause the processor to control the programmable device to perform sending, to the first and second devices via a communication network, a request to overlay the gridlines on the shared screen displayed at the first and second devices.

\* \* \* \* \*